United States Patent
Chong et al.

(10) Patent No.: US 8,079,113 B2
(45) Date of Patent: Dec. 20, 2011

(54) VACUUM CLEANER HAVING ABILITIES FOR AUTOMATIC MOVING AND POSTURE CONTROL AND METHOD OF CONTROLLING THE SAME

(75) Inventors: Chung-Ook Chong, Daegu (KR);
Kyeong-Seon Jeong, Changwon (KR);
Kie-Tak Hyun, Changwon (KR);
Seong-Koo Cho, Busan (KR);
Geun-Bae Hwang, Changwon (KR);
Kyu-Chun Choi, Ulsan (KR);
Jin-Hyouk Shin, Busan (KR);
Jong-Kyu Jang, Sooncheon (KR)

(73) Assignee: LG Electronics Inc., Seoul (KR)

(*) Notice: Subject to any disclaimer, the term of this patent is extended or adjusted under 35 U.S.C. 154(b) by 329 days.

(21) Appl. No.: 12/438,896

(22) PCT Filed: Aug. 14, 2007

(86) PCT No.: PCT/KR2007/003907
§ 371 (c)(1),
(2), (4) Date: Apr. 28, 2009

(87) PCT Pub. No.: WO2009/022759
PCT Pub. Date: Feb. 19, 2009

(65) Prior Publication Data
US 2009/0217478 A1    Sep. 3, 2009

(51) Int. Cl.
*A47L 7/00* (2006.01)
*A47L 9/28* (2006.01)
(52) U.S. Cl. ...... 15/319; 15/327.2; 15/339; 15/DIG. 10; 15/340.1

(58) Field of Classification Search .............. 15/319, 15/327.2, 339, DIG. 10, 340.1
See application file for complete search history.

(56) References Cited

U.S. PATENT DOCUMENTS

| 5,144,716 | A * | 9/1992 | Watanabe et al. ............... 15/323 |
| 2001/0039691 | A1* | 11/2001 | Bobrosky et al. ............... 15/339 |
| 2004/0134019 | A1 | 7/2004 | Cipolla et al. |
| 2005/0171639 | A1 | 8/2005 | Uehigashi et al. |
| 2007/0209145 | A1* | 9/2007 | Tullett .............................. 15/339 |
| 2008/0077278 | A1* | 3/2008 | Park et al. ...................... 700/258 |

FOREIGN PATENT DOCUMENTS

| DE | 100 13 888 A1 | 9/2001 |
| EP | 1 707 099 A1 | 10/2006 |
| FR | 1 310 618 | 11/1962 |
| JP | 3-267035 A | 11/1991 |
| JP | 7-261812 A | 10/1995 |
| JP | 2000-300486 A | 10/2000 |
| JP | 2002-175422 A | 6/2002 |
| WO | 99/07272 A1 | 2/1999 |

* cited by examiner

*Primary Examiner* — David Redding
(74) *Attorney, Agent, or Firm* — Birch, Stewart, Kolasch & Birch, LLP

(57) ABSTRACT

The present invention discloses a vacuum cleaner including a main body (1) of the vacuum cleaner, a wheel (2) rotatably mounted at the body, a driving unit for driving the wheel (2), a sensor (71) positioned at the main body, for sensing an inclined direction of the main body (1), and a control unit for controlling the driving unit according to the inclined direction of the main body (1) sensed by the sensor (71). In this configuration, the posture of the main body (1) of the vacuum cleaner can be controlled according to the inverted pendulum control theory. Therefore, the main body (1) of the vacuum cleaner can maintain the posture thereof not to fall down.

9 Claims, 4 Drawing Sheets

[Fig. 1]
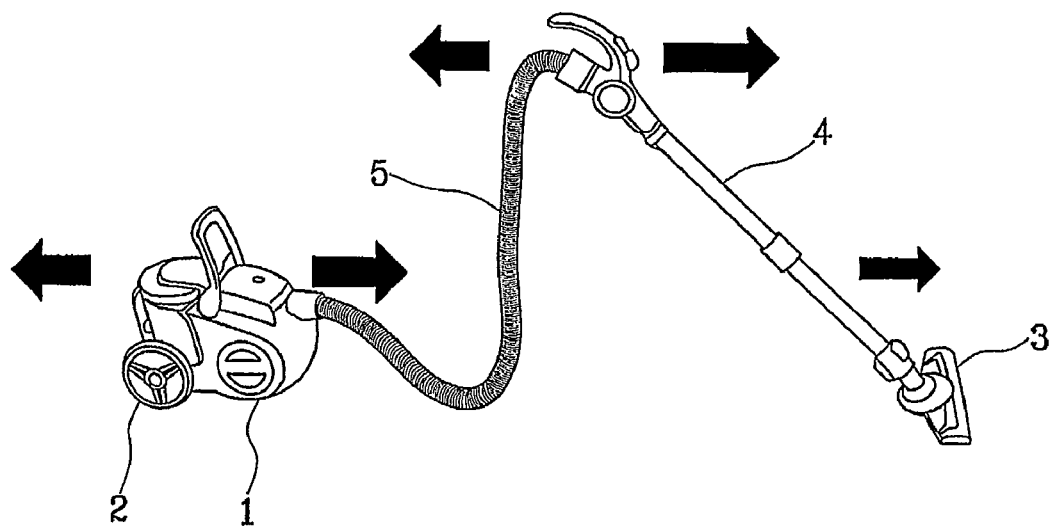
[Fig. 2]
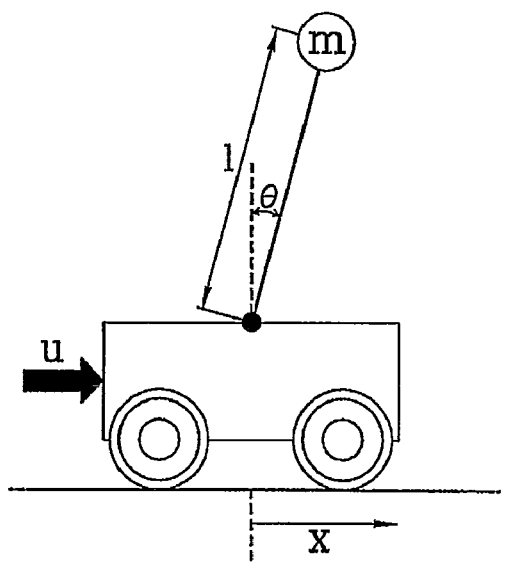
[Fig. 3]
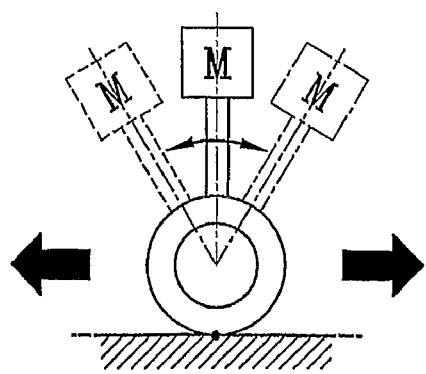

[Fig. 4]
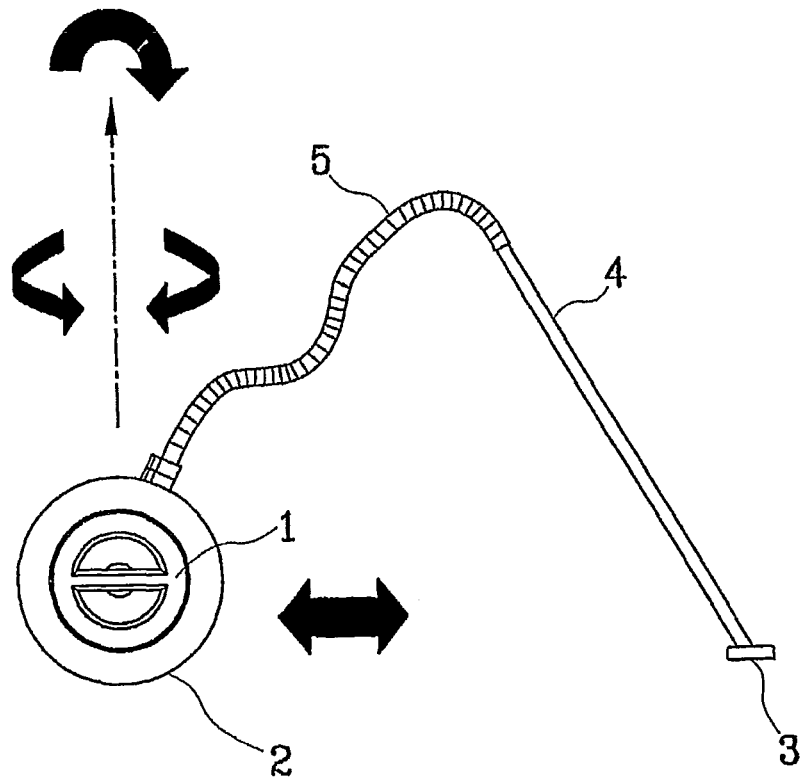
[Fig. 5]
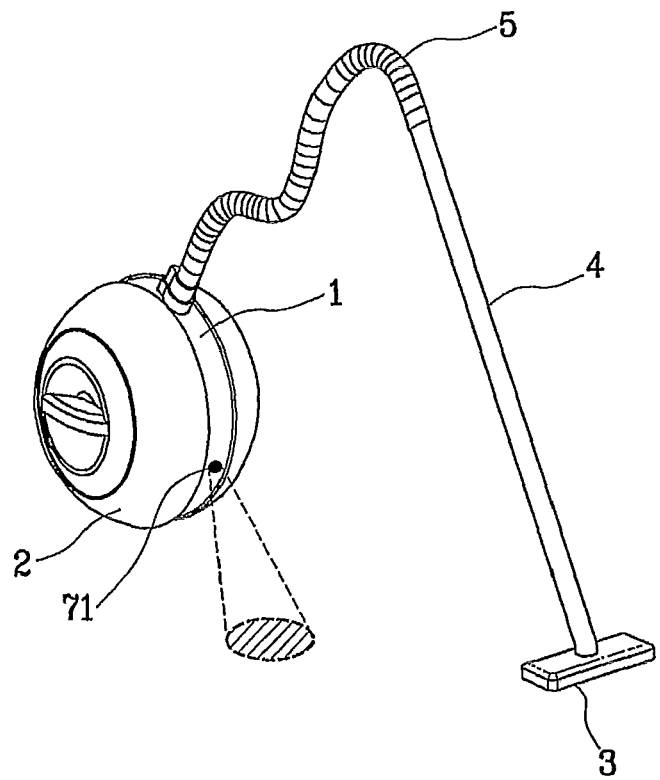

[Fig. 6]
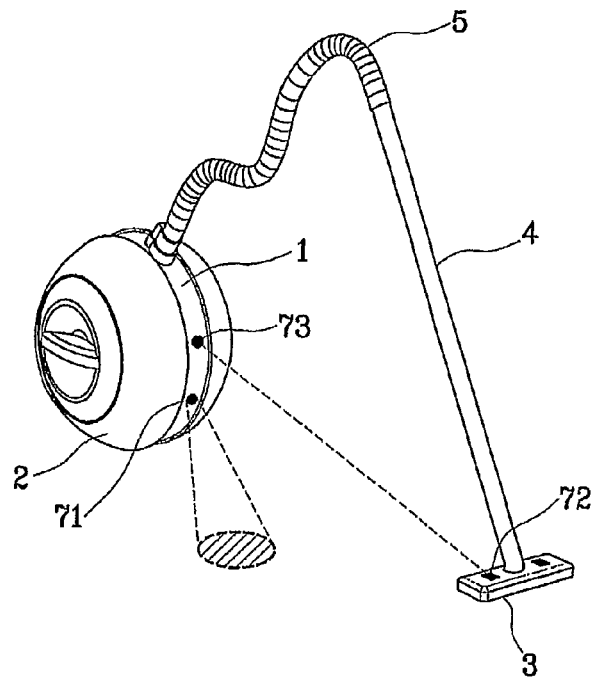
[Fig. 7]
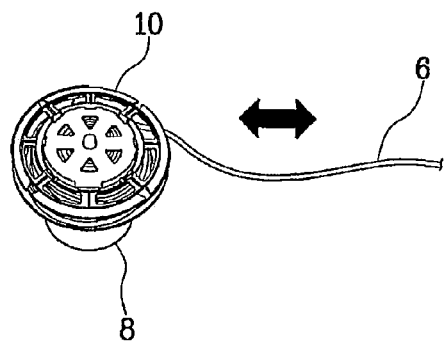
[Fig. 8]
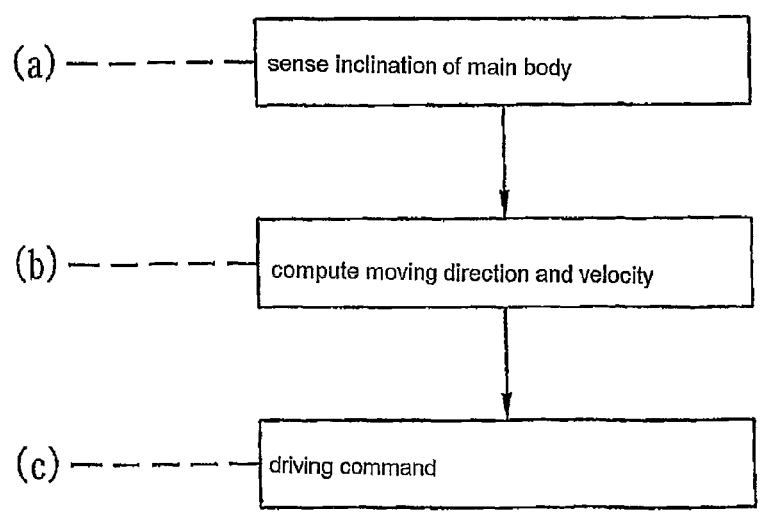

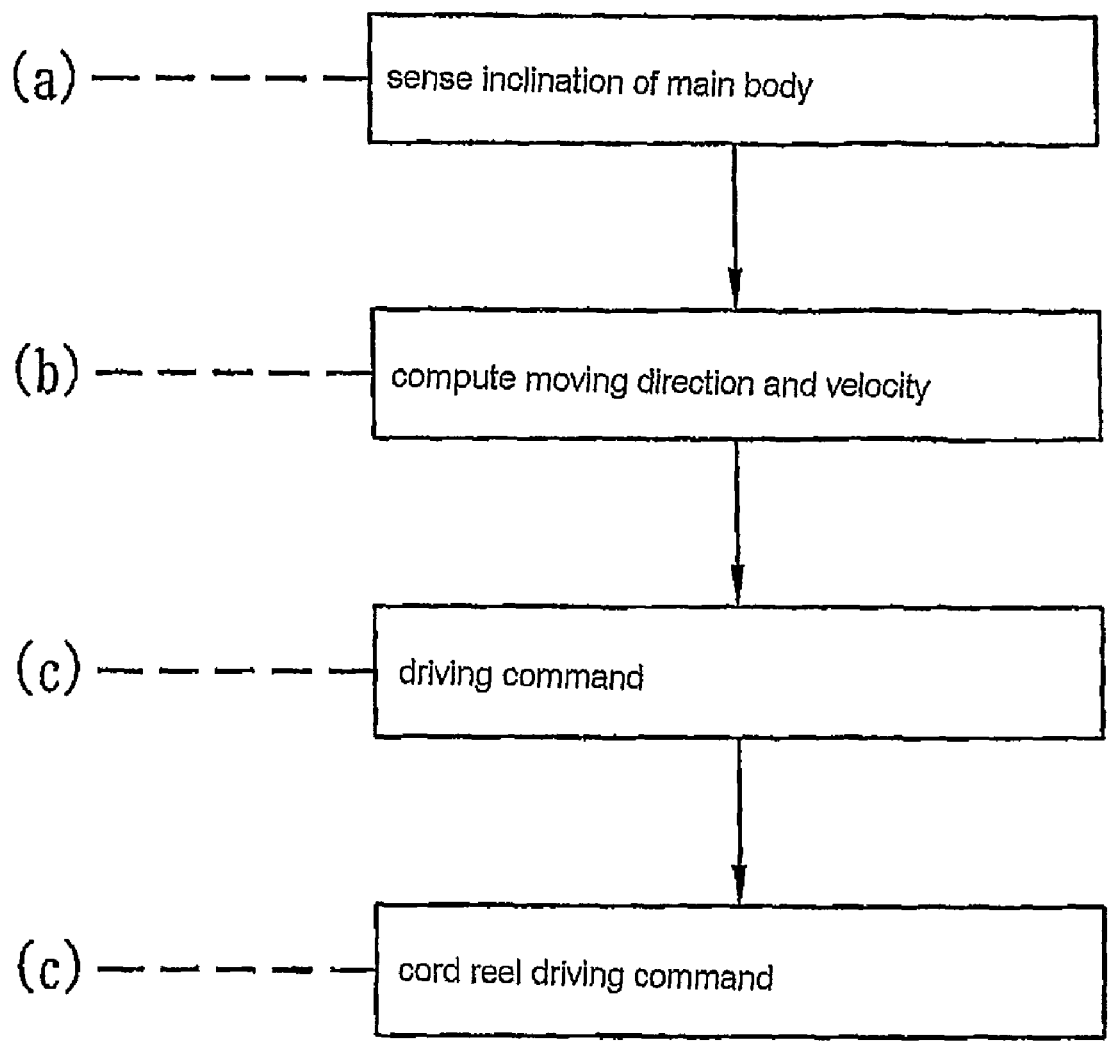

VACUUM CLEANER HAVING ABILITIES FOR AUTOMATIC MOVING AND POSTURE CONTROL AND METHOD OF CONTROLLING THE SAME

TECHNICAL FIELD

The present invention relates to a vacuum cleaner, and more particularly, to a vacuum cleaner which can sense an inclined direction of a main body and drive wheels so that the main body can maintain the posture thereof not to fall down.

BACKGROUND ART

A vacuum cleaner sucks the air containing impurities by using a vacuum pressure generated by a vacuum motor installed in a main body, filters off the impurities in the main body, and collects and discharges the impurities.

The vacuum cleaner sucks the air containing impurities through a suction nozzle. When the user intends to clean a large area, he/she must continuously change the position of the suction nozzle, and thus continuously move the main body connected to the suction nozzle.

FIG. 1 illustrates a conventional vacuum cleaner. In the conventional vacuum cleaner, a main body 1 includes wheels 2. However, when the user does the cleaning, in order to move the main body 1, he/she must pull the main body 1 by applying force. Besides the cleaning, it is laborious to move the vacuum cleaner. Such a work becomes a physical burden on a user, particularly, a woman or a sick or aged person. As a result, the cleaning becomes more laborious and troublesome. So as to solve the foregoing problems, a tractive force of moving the cleaner must be minimized. In addition, the cleaner must be able to move or change a direction as intended by the user even in a narrow space.

DISCLOSURE OF INVENTION

Technical Problem

An object of the present invention is to provide a vacuum cleaner which can control a driving unit so that a main body can maintain a posture thereof not to fall down.

Another object of the present invention is to provide a vacuum cleaner which can control a moving velocity and direction of a main body according to a traveling direction of a suction nozzle unit, while maintaining the posture of the main body.

Yet another object of the present invention is to provide a vacuum cleaner which can control a loosened length of a cord reel by driving a cord reel driving unit, while maintaining a posture of a main body and moving the main body.

Yet another object of the present invention is to provide a method of controlling a vacuum cleaner so that a main body of the vacuum cleaner can maintain a posture thereof.

Yet another object of the present invention is to provide a method of controlling a vacuum cleaner so that a main body of the vacuum cleaner can maintain a posture thereof, keeping a distance from a suction nozzle unit within a predetermined range.

Yet another object of the present invention is to provide a method of controlling a vacuum cleaner which can drive a cord reel according to a moving direction and velocity of a main body of the vacuum cleaner.

Technical Solution

There is provided a vacuum cleaner, including: a main body of the vacuum cleaner; a wheel rotatably mounted at the main body; a driving unit for driving the wheel; a sensor positioned at the main body, for sensing an inclined direction of the main body; and a control unit for controlling the driving unit according to the inclined direction of the main body sensed by the sensor. In this configuration, the posture of the main body of the vacuum cleaner can be controlled according to the inverted pendulum control theory. Therefore, the main body of the vacuum cleaner can maintain the posture thereof not to fall down.

In another aspect of the present invention, an outer diameter of the wheel is larger than an outer diameter of the main body. In this configuration, since the wheel has a large outer diameter, the main body can easily change a direction. Moreover, the vacuum cleaner can easily get over an obstacle such as a doorsill.

In yet another aspect of the present invention, the sensor includes any one of a gyroscope, an accelerometer, a tilt sensor and a potentiometer.

In yet another aspect of the present invention, the sensor faces the bottom surface, and senses the inclined direction of the main body by measuring a distance between the sensor and the bottom surface. In this configuration, a simple distance measuring sensor such as an ultrasonic or infrared sensor measures increase and decrease of the distance between the sensor and the bottom surface, and determines the inclined direction of the main body of the vacuum cleaner.

In yet another aspect of the present invention, the control unit drives the driving unit so that the main body can move in the inclined direction thereof.

In yet another aspect of the present invention, the vacuum cleaner further includes: a suction nozzle unit connected to the main body; and a corresponding sensor pair positioned at the main body and the suction nozzle unit, for measuring a distance between the main body and the suction nozzle unit, wherein the control unit drives the driving unit so that a distance between the sensor of the main body and the corresponding sensor can exist within a predetermined range. This configuration not only controls the posture of the main body, but also keeps the distance between the main body and the suction nozzle unit within the predetermined range, which offers convenience to the user.

In yet another aspect of the present invention, two or more corresponding sensor pairs are installed, and the control unit controls a driving direction and velocity of the driving unit by comparing distances of each corresponding sensor pair. In this configuration, the main body can move relatively to a moving direction of the suction nozzle unit, to thereby afford convenience to the user.

In yet another aspect of the present invention, the vacuum cleaner further includes a cord reel and a cord reel driving unit, wherein the control unit drives the cord reel driving unit according to the operation of the driving unit for driving the wheel. In this configuration, as the control unit controls the cord reel driving unit to reel and unreel a cord according to the movement of the main body, the user can omit a process of unreeling the cord before the cleaning and reeling the cord after the cleaning.

In addition, there is provided a method of controlling a vacuum cleaner moving a main body in an inclined direction thereof, including: a first step of sensing the inclined direction of the main body; a second step of computing a driving direction and velocity of the main body; and a third step of driving a driving unit according to the values computed in the second step.

In another aspect of the present invention, the third step controls each driving unit for driving each wheel.

In yet another aspect of the present invention, the third step further includes a process of driving a cord reel driving unit according to the values computed in the second step.

Advantageous Effects

In the vacuum cleaner and the method of controlling the same according to the present invention, the main body of the vacuum cleaner can control the posture thereof during the movement by adopting the inverted pendulum control theory.

In the vacuum cleaner and the method of controlling the same according to the present invention, as the main body is automatically driven according to the relative position to the suction nozzle unit, the user does not have to pull the main body in person during the cleaning. It is thus possible to reduce or omit the labor of moving the main body of the vacuum cleaner.

In the vacuum cleaner and the method of controlling the same according to the present invention, the cord reel driving unit is installed at the power cord reel, for automatically unreeling and reeling the power cord according to the movement of the main body of the vacuum cleaner. Therefore, the user does not have to unreel the power cord to an adequate length before the cleaning and reel the power cord around the reel after the cleaning.

BRIEF DESCRIPTION OF THE DRAWINGS

FIG. 1 is a view illustrating one example of a conventional vacuum cleaner;

FIGS. 2 and 3 are typical views helping to explain the inverted pendulum control theory for the control of the present invention;

FIGS. 4 and 5 are views illustrating a vacuum cleaner with a posture control function in accordance with one embodiment of the present invention;

FIG. 6 is a view illustrating a vacuum cleaner with a posture control function including a sensor for measuring a distance between a suction nozzle unit and a main body in accordance with another embodiment of the present invention;

FIG. 7 is a view illustrating a vacuum cleaner with a posture control function including a cord reel driving unit in accordance with yet another embodiment of the present invention; and FIGS. 8 and 9 are flowcharts typically showing a method of controlling a vacuum cleaner in accordance with one embodiment of the present invention.

MODE FOR THE INVENTION

A vacuum cleaner and a method of controlling the same in accordance with preferred embodiments of the present invention will be described in detail with reference to the accompanying drawings.

FIG. 2 illustrates a model for explaining the inverted pendulum control theory. The inverted pendulum principle will be briefly explained by a simple example. When one stands a stick on the palm, if the stick is slightly out of equilibrium, the stick easily falls down. That is, an upper portion of the stick rotates and falls down. In this situation, if the palm, namely, a lower portion of the stick moves in the falling direction of the upper portion of the stick, the stick does not fall down. The inverted pendulum control theory uses this principle.

In FIG. 2, an angle formed by the stick and the vertical line is defined as '$\theta$'. It is assumed that a mass of a cart is 'M', a mass of a pendulum is 'm', a length of the stick is 'l', and the mass m of the pendulum is concentrated on the end of the stick on which the pendulum suspends. When this system is limited to a two dimensional motion model on the xy plane and the coordinates of a gravity center of the mass m of the pendulum are indicated as ($x_G$, $y_G$), the following relational expression is established:

$$x_G = x + l \sin\theta, y_G = l \cos\theta \quad \text{Formula 1}$$

When Newton's second law is applied to the whole system including the cart and the mass, the motion equation of the x-direction translation is represented by the following formula:

$$M\frac{d^2}{dt^2}x + m\frac{d^2}{dt^2}x_G = M\frac{d^2}{dt^2}x + m\frac{d^2}{dt^2}(x + l\sin\theta) = u \quad \text{Formula 2}$$

It can be summarized as follows.

$$(M+m)x'' - ml(\sin\theta)\theta'^2 + ml(\cos\theta)\theta'' = u \quad \text{Formula 3}$$

The mass m suspending on the stick performs a rotation around an axis of the stick fixed to the cart. Such a rotation can be represented by the following formula:

$$m\frac{d^2}{dt^2}x_G l\cos\theta - m\frac{d^2}{dt^2}y_G l\sin\theta = m\left[\frac{d^2}{dt^2}(x + l\sin\theta)\right] \quad \text{Formula 4}$$

$$l\cos theta - $$

$$m\left[\frac{d^2}{dt^2}(l\cos\theta)\right] l\sin\theta$$

$$= mgl\sin\theta$$

$$m[x'' - l(\sin\theta)\theta'^2 + l(\cos\theta)\theta'']l\cos\theta + \quad \text{Formula 5}$$

$$m[l(\cos\theta)\theta'^2 + l(\sin\theta)\theta'']l\sin\theta = mgl\sin\theta$$

Here, 'g' denotes a gravity acceleration. The above formula can be simplified as follows.

$$mx'' \cos\theta + ml\theta'' = mg \sin\theta \quad \text{Formula 6}$$

The motion equations of Formulae 5 and 6 computed above are nonlinear differential equations. The inverted pendulum is intended to maintain the vertical position. Accordingly, it can be assumed that an angle $\theta$ and an angular velocity $\theta'$ (namely, $\omega$) are very small values, namely, $$\theta \approx 0, \theta' \approx 0.$$

As $$\cos\theta \approx 1, \sin\theta \approx 0$$

are satisfied, Formulae 5 and 6 can be linearized into the following linear equation:

$$(M+m)x'' + ml\theta'' = u \quad \text{Formula 7}$$

$$mx'' + ml\theta'' = mg\theta$$

Formula 7 is approximately satisfied when the angle $\theta$ and the angular velocity $\theta'$ vary within a small range. It is more desirable to continuously control a posture of a main body of a vacuum cleaner so that the angle $\theta$ and the angular velocity $\theta'$ exist within a small range, because it shortens a wheel driving distance for the posture control of the main body. Therefore, Formula 7 can be used under the assumption of the linear equation. The above-described inverted pendulum control theory is being applied to a posture control of a personal transporting means called a segway and a walking posture control of a human type robot.

FIG. 3 typically shows a mass system and a control method according to the present invention. If the mass system maintaining an equilibrium state inclines forward, the mass system moves forward to reach the equilibrium state again. If the mass system inclines backward, the mass system moves backward.

In the case of a general pendulum, a weight, namely, a mass concentration point suspends on a fixed point. In the general pendulum, the mass concentration point moves so that a mass system can maintain a stabilization state, namely, an equilibrium state. The weight descends from a higher position to a bottommost point with the lowest potential energy which is in the stabilization state. On the contrary, an inverted pendulum is supported by a non-fixed point, and a mass concentration point exists in the highest position. When the mass concentration point is supported at the highest point perpendicularly to the bottom surface, a mass system is in a stabilization state. When the mass concentration point is not perpendicularly supported but inclined to any one side, in order to return to an equilibrium state, differently from the general pendulum system, a supporting point moves to the side which the mass concentration point inclines to. The present invention adopts the latter inverted pendulum theory.

According to one embodiment of the present invention, referring to FIG. 4, an outer diameter of a wheel 2 is larger than an outer diameter of a main body 1 of a vacuum cleaner. When the outer diameter of the wheel 2 is large, it is advantageous for the vacuum cleaner to change a direction or get over a doorsill. A sensor 71 facing the bottom surface is installed at the main body 1. The sensor 71 can measure a distance variation between the sensor 71 and the bottom surface and a relative velocity and an acceleration of the sensor 71 to the bottom surface, or measure an angle variation or an angular velocity and an angular acceleration. A control unit (not shown) receives the values measured by the sensor 71, computes a moving velocity and a moving direction required for the main body 1 to maintain the posture without falling down, and commands a driving unit (not shown) for driving the wheel 2 to move in the computed direction and velocity. That is, the driving unit is driven according to the inverted pendulum control theory described above.

Accordingly, when the user intends to move the main body 1 forward, the user slightly inclines the main body 1 forward by using a handle 4 connected to the main body 1, so that the main body 1 itself controls the posture thereof and automatically moves in the direction intended by the user. In addition, although the user does not intendedly inclines the main body 1, when the user moves forward and does the cleaning, he/she pushes forward a suction nozzle unit 3 and the handle 4 connected to the main body 1, so that the main body 1 is pulled by the handle 4 to incline forward. In the actual use, the main body 1 smoothly moves with the movement of the user.

According to the one embodiment of the present invention, as illustrated in FIG. 5, when two wheels 2 are installed at both sides of the main body 1 and two driving units are installed to control the wheels 2, respectively, the main body 1 can rotate and change a direction as well as move forward and backward. Since the main body 1 of the vacuum cleaner can be inclined in any direction including the forward and backward directions, it is more preferable to control the two wheels 2 respectively to change the direction.

According to a more preferable embodiment of the present invention, referring to FIG. 6, one or more sensor pairs 72 and 73 for measuring a distance between a main body 1 and a suction nozzle unit 3 are installed to move the main body 1 relatively to the movement of the suction nozzle unit 3. The sensors 72 and 73 can be optical sensors such as infrared sensors and ultrasonic sensors. For example, the distance measuring sensors 72 and 73 are installed at the suction nozzle unit 3 and the main body 1 to correspond to each other. The distance between the sensors 72 and 73 is the distance between the suction nozzle unit 3 and the main body 1. If the suction nozzle unit 3 and the main body 1 are distant from each other, the main body 1 moves forward toward the suction nozzle unit 3 to maintain an adequate distance from the suction nozzle unit 3. If the suction nozzle unit 3 and the main body 1 are close to each other, the main body 1 moves backward. While the main body 1 moves relatively to the suction nozzle unit 3, the control unit controls the posture of the main body 1 according to the inverted pendulum control theory, so that the main body 1 does not fall down.

According to yet another embodiment of the present invention, as shown in FIG. 7, a cord reel driving unit 8 is installed at a power cord reel 10. When a control unit gives a driving command to a driving unit to drive a wheel 2, if the control unit gives a driving command containing the same speed or velocity to the cord reel driving unit 8, the cord reel driving unit 8 automatically unreels a power cord 6 with a movement of a main body 1. Therefore, when the user does the cleaning, he/she can omit a process of unreeling the power cord 6 to an adequate length in advance.

The present invention also provides a method of controlling a vacuum cleaner. When the user moves to suck impurities into a suction nozzle unit 3, he/she generally grips a handle 4 and moves the suction nozzle unit 3 forward or backward. If the user moves the handle 4 forward, a main body 1 inclines forward. According to one embodiment of the present invention, an inclined direction of the main body 1 is measured. The inclined direction and distance of the main body 1 can be computed by measuring an inclined angle or a distance from a bottom surface. As described above, various sensors such as a gyroscope, an accelerometer, a tilt sensor and a potentiometer can be used to measure the inclined direction and angle of the main body 1. After the inclined direction and angle of the main body 1 have been measured, a moving direction and velocity required for the main body 1 to reach an equilibrium state again can be computed according to the inverted pendulum control theory. The control unit computes these values and gives the driving command to the driving unit so that the main body 1 can move in the computed direction and velocity.

According to another embodiment of the present invention, provided is a method of controlling driving units for driving two wheels 2 installed at a main body 1. When the user does the cleaning, he/she can rotate to the left or right side as well as move forward or backward. When the user moves a handle 4 to the left or right side, the main body 1 inclines to the left or right side. In this case, a direction in which the main body 1 must move is computed as the left or right direction. In order to give a command of moving the main body 1 in the computed direction, the control unit must be able to control the driving units, respectively. For example, if the main body 1 needs to move to the left side faster, a revolution number of the left driving unit can be adjusted higher than that of the right driving unit. If the main body 1 needs to change a direction in the same position, one wheel driving unit can be stopped and the other wheel driving unit can be driven. That is, this embodiment provides the method of controlling the driving units for driving the wheels 2, respectively.

According to yet another embodiment of the present invention, provided is a method of controlling an automatic cord reel 10 for reeling and unreeling a power cord 6, while driving a wheel 2. A control unit receives information on an inclined direction and angle of a main body 1, computes a driving velocity and direction of the wheel 2 of the main body 1, and gives a driving command to a driving unit. Here, if the power cord 6 is reeled and unreeled around/from the cord reel 10 in the same velocity and direction as the driving velocity and direction of the wheel 2, the power cord 6 maintains a constant tension. As a loosened length of the power cord 6 is adjusted to an adequate level, the user can conveniently do the cleaning. A cord reel driving unit 8 must be installed at the cord reel 10. Preferably, the cord reel driving unit 8 is a motor capable of performing forward/backward rotation, more preferably, a step motor capable of performing forward/backward rotation.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A vacuum cleaner, comprising:
a main body of the vacuum cleaner;
a wheel rotatably mounted at the main body, wherein an outer diameter of the wheel is larger than an outer diameter of the main body;
a driving unit for driving the wheel;
a sensor positioned at the main body, for sensing an inclined direction of the main body; and
a control unit for controlling the driving unit according to the inclined direction of the main body sensed by the sensor.

2. The vacuum cleaner of claim 1, wherein the sensor comprises any one of a gyroscope, an accelerometer, a tilt sensor and a potentiometer.

3. The vacuum cleaner of claim 1, wherein the sensor faces the bottom surface, and senses the inclined direction of the main body by measuring a distance between the sensor and the bottom surface.

4. The vacuum cleaner of claim 1, wherein the control unit drives the driving unit so that the main body can move in the inclined direction thereof.

5. A vacuum cleaner, comprising:
a main body of the vacuum cleaner;
a wheel rotatably mounted at the main body;
a driving unit for driving the wheel;
a sensor positioned at the main body, for sensing an inclined direction of the main body; and
a control unit for controlling the driving unit according to the inclined direction of the main body sensed by the sensor,
wherein the vacuum cleaner further comprises:
a suction nozzle unit connected to the main body; and
a corresponding sensor pair positioned at the main body and the suction nozzle unit, for measuring a distance between the main body and the suction nozzle unit,
wherein the control unit drives the driving unit so that a distance between the sensor of the main body and the corresponding sensor can exist within a predetermined range.

6. The vacuum cleaner of claim 5, wherein the corresponding sensor pair is installed as two or more pairs of sensors, and the control unit controls a driving direction and velocity of the driving unit by comparing distances of each corresponding sensor pair.

7. A vacuum cleaner, comprising:
a main body of the vacuum cleaner;
a wheel rotatably mounted at the main body;
a driving unit for driving the wheel;
a sensor positioned at the main body, for sensing an inclined direction of the main body; and
a control unit for controlling the driving unit according to the inclined direction of the main body sensed by the sensor,
wherein the vacuum cleaner further comprises:
a cord reel; and
a cord reel driving unit,
wherein the control unit drives the cord reel driving unit according to the operation of the driving unit for driving the wheel.

8. A method of controlling a vacuum cleaner moving a main body in an inclined direction thereof, comprising:
a first step of sensing the inclined direction of the main body;
a second step of computing a driving direction and velocity of the main body; and
a third step of driving a driving unit and a cord reel driving unit according to the values computed in the second step.

9. The method of claim 8, wherein the third step controls each driving unit for driving each wheel.

* * * * *